(12) United States Patent
van Someren et al.

(10) Patent No.: US 7,859,760 B2
(45) Date of Patent: Dec. 28, 2010

(54) METHOD AND APPARATUS FOR IMAGING

(75) Inventors: Bob van Someren, Rotterdam (NL); Pieter Kruit, Delft (NL)

(73) Assignee: Technische Universiteit Delft, Delft (NL)

( * ) Notice: Subject to any disclaimer, the term of this patent is extended or adjusted under 35 U.S.C. 154(b) by 39 days.

(21) Appl. No.: 12/339,551

(22) Filed: Dec. 19, 2008

(65) Prior Publication Data

US 2009/0180192 A1 Jul. 16, 2009

Related U.S. Application Data

(63) Continuation-in-part of application No. PCT/NL2007/050303, filed on Jun. 22, 2007.

(30) Foreign Application Priority Data

Jun. 27, 2006 (NL) .................................... 1032066

(51) Int. Cl.
G02B 27/10 (2006.01)
(52) U.S. Cl. ...................... 359/626; 359/900
(58) Field of Classification Search ................ 359/626, 359/618, 619, 900
See application file for complete search history.

(56) References Cited

U.S. PATENT DOCUMENTS

| 5,270,859 A | 12/1993 | Wirth et al. |
| 5,392,157 A | 2/1995 | Shih |

FOREIGN PATENT DOCUMENTS

| EP | 1204131 | 5/2002 |
| WO | WO 93/20473 | 10/1993 |

*Primary Examiner*—Jack Dinh
(74) *Attorney, Agent, or Firm*—Jeffrey D. Myers; Jacques van Breda; Peacock Myers, P.C.

(57) ABSTRACT

A method for forming an image of a beam source that during operation provides a beam, and wherein the beam is split so as to divide the beam into beamlets, wherein a redirecting organ is used with which each individual beamlet is redirected to a predetermined degree with the extent of redirection of each beamlet by means of the redirecting organ depending on the distance of that beamlet to a central axis of the beam, such that the beamlets converge in a common point with the beamlets from the beam source being focused to foci located in the redirecting organ, and with the beamlets originating from these foci being focused in the common imaging point.

11 Claims, 4 Drawing Sheets

"PRIOR ART"

METHOD AND APPARATUS FOR IMAGING

CROSS-REFERENCE TO RELATED APPLICATIONS

This application is a continuation-in-part application of International Patent Application Serial No. PCT/NL2007/050303, entitled Method and Apparatus for Imaging, by Bob Van Someren and Pieter Kruit, to Technische Universiteit Delft, filed on Jun. 22, 2007, and the specification and claims thereof are incorporated herein by reference.

This application claims priority to and the benefit of the filing of Netherlands Patent Application Serial No. 1032066, entitled "Method and Apparatus for Imaging", filed on Jun. 27, 2006, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to a method and apparatus for forming an image of a beam source that during operation provides a beam, and wherein the beam is split so as to divide the beam into beamlets.

2. Description of Related Art

From the international patent application WO 93/20473 an apparatus is known for forming an image, using a double microlens screen placed centrally between an array of lenses at either side thereof.

The American patent specification U.S. Pat. No. 5,270,859 shows a similar optical apparatus, which apparatus depicts in FIG. 5 a centrally placed microlens module, with such like microlens modules at either side.

BRIEF SUMMARY OF THE INVENTION

The apparatus, to which the invention relates, is provided with a macrolens or a set of deflectors for deflecting the individual beamlets into the desired direction.

The beam source may be a source for ions, electrons, but also for light. Such an apparatus and method as referred to in the preamble may be applied in various fields, in particular, but not exclusively, in the field of lithography, microscopy and electron microscopy.

It is the object of the invention to avoid imaging aberrations as much as possible, and thus to improve the precision of the image.

To this end the method and apparatus according to the invention are characterized by one or several of the appended claims.

DETAILED DESCRIPTION OF THE INVENTION

In a first aspect the method according to the invention is characterized in that a redirecting organ is used with which each individual beamlet is redirected to a predetermined degree with the extent of redirection of each beamlet by means of the redirecting organ depending on the distance of that beamlet to a central axis of the beam, such that the beamlets converge in a common point with the beamlets from the beam source being focused to foci located in the redirecting organ, and with the beamlets originating from these foci being focused in the common imaging point.

This method is preferably further characterized in that the deflection of the beamlets is adjusted such that at the imaging point, the phase difference between the beamlets is 0 or 2 pi or a whole multiple of 2 pi. This provides a coherent imaging point. Optimal results may be achieved by preferably adjusting the redirecting organ of the beamlets such that the beamlets have a substantially equal optical path length relationship between the beam source and the imaging point.

It is further desirable that, viewed in the radial direction from the axis of the beam, the dimension of each beamlet is such that no noticeable spherical aberrations remain.

The method may conveniently be realized in an apparatus comprising a beam source and a beam splitter for the formation of beamlets from a beam originating from the beam source, as well as a redirecting organ for the redirection of the beamlets, wherein a first array of focusing means is provided before the redirecting organ and a second array of focusing means is provided after the redirecting organ.

According to the invention, this apparatus is characterized in that the first array of focusing means, the second array of focusing means, and the redirecting organ are adjustable or are adjusted such that the beamlets originating from the beam source converge in foci located in the plane of the redirecting organ, that the extent to which the redirecting organ redirects the beamlets depends on the distance of each beamlet to a central axis of the beam, and that the beamlets originating from the foci located in the redirecting organ are focused on a common imaging point, where these beamlets converge.

A basic embodiment that serves the purpose of the apparatus according to the invention and that may easily be realized with means that are not new in themselves, is characterized in that the first array of focusing means and/or the second array of focusing means comprise a microlens array.

It should be noted that the beam splitter to be applied in the apparatus according to the invention, is in itself not new. It is possible, for example, to use an aperture array for this purpose. However, in the context of the invention it is preferred for the beam splitter to be embodied as the first array of focusing means or as part thereof. If the first focusing means comprise a microlens array, this microlens array may also serve as beam splitter.

The precision of the apparatus according to the invention may be further improved by embodying the redirecting organ as macrolens. It is further advantageous to provide this macrolens in the path of each beamlet with a deflector. Instead of as macrolens, the redirecting organ may also be embodied as a collection of deflectors.

It should be noted that when applied to charged particles such as electrons or ions, the focusing means of the first array and the second array may be embodied as a system of plates in which openings are provided, which plates may be set to mutually differing potentials in order to thus realize the desired degree of focusing. A suitable embodiment of these openings is chosen from the group comprising a matrix of holes, and circular slots.

Hereinafter the invention will be further elucidated by way of the following discussion of several possible embodiments of the method and apparatus according to the invention, and with reference to the drawing.

BRIEF DESCRIPTION OF THE SEVERAL VIEWS OF THE DRAWINGS

The drawing shows in:

FIG. 2 a first embodiment of an apparatus according to the invention in;

FIG. 4 a second embodiment of an apparatus according to the invention in;

Identical reference numerals in the figures refer to similar parts.

DETAILED DESCRIPTION OF THE INVENTION

Figure 1:
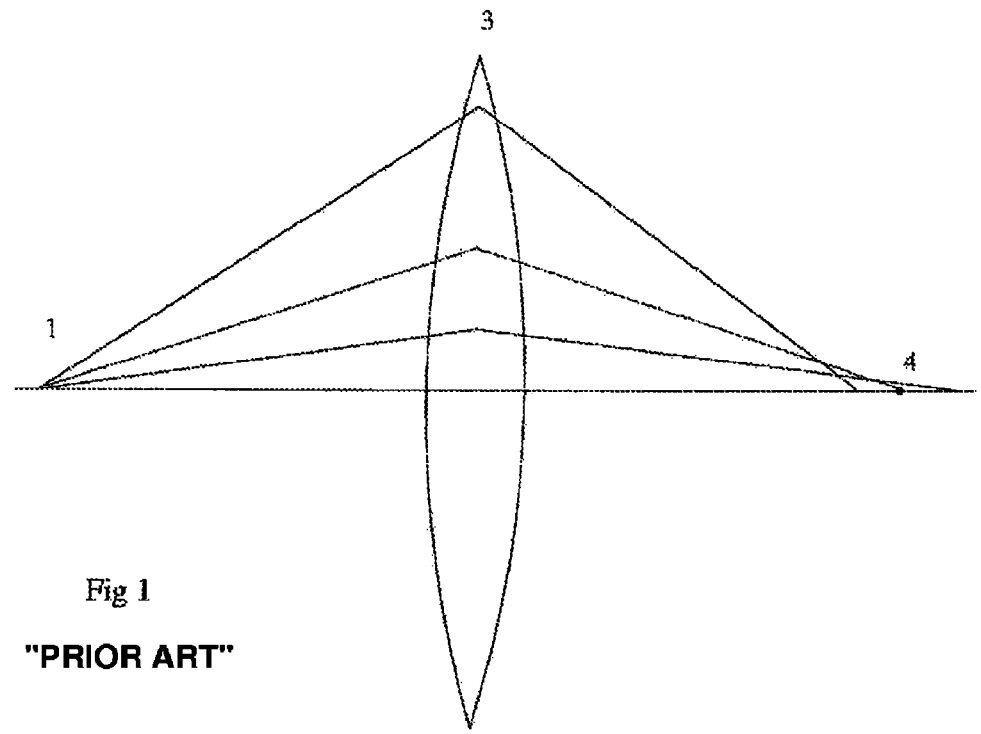
FIG. 1 an apparatus according to the prior art.

Referring first to FIG. 1, an apparatus according to the prior art is shown, comprising a beam source 1 and a redirecting organ in the form of a macrolens 3 for imaging the beam source 1 in an imaging point 4.

The figure shows that beamlets travelling from source 1 are deflected more strongly the higher the place of incidence with respect to the lens. The result is that the image of the beam source 1 in the imaging point 4 is not in focus.

Figure 2:
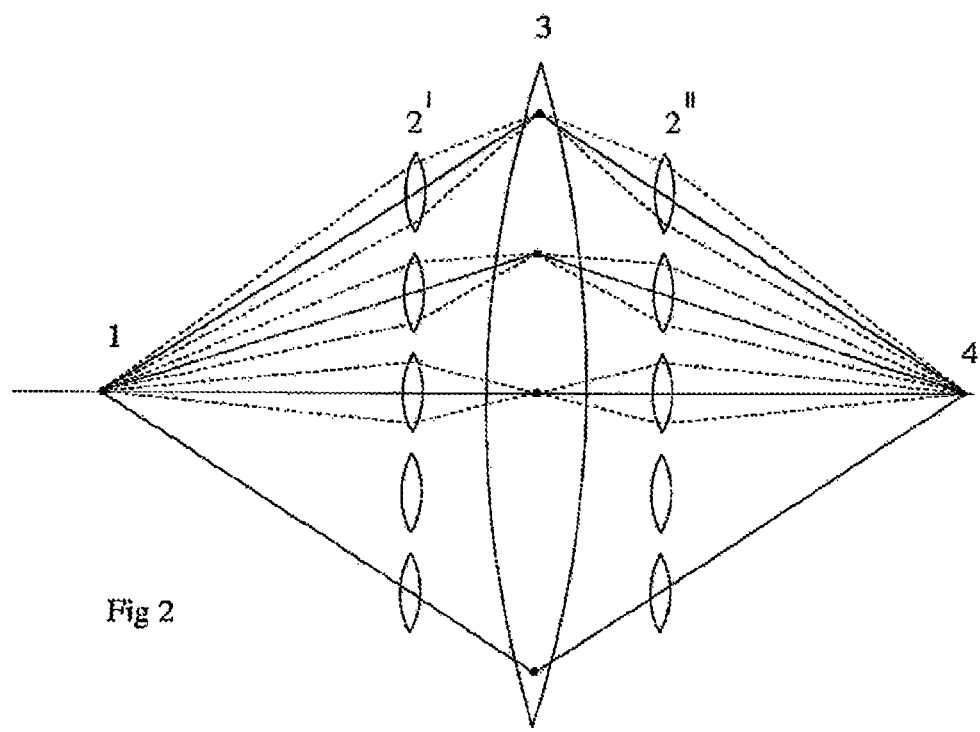

FIG. 2 shows a basic configuration of the apparatus according to the invention, also involving a beam source 1. There is also a beam splitter 2' for the formation of beamlets from a beam that originates from the beam source 1. For the formation of the beamlets, the beam splitter may be provided with an aperture array (not shown). It is also possible, as shown in FIG. 2, to use a microlens array 2' as beam splitter, as will later be explained in more detail. The apparatus further comprises a macrolens 3 for redirecting the individual beamlets.

FIG. 2 shows that a first array of focusing means is provided—in the form of said microlens array 2'—positioned before the macrolens 3, as well as a second array of focusing means 2''—also in the form of a microlens array 2''—placed after the macrolens 3. The first array of focusing means 2', the second array of focusing means 2'' and the lens 3 are then adjusted (or are adjustable) such that the beamlets can be focused to finally converge precisely in a common imaging point 4. In this way the spherical and/or chromatic aberration occurring in the macrolens 3 is thereby compensated. The degree in which the lens 3 redirects each individual beamlet always depends on the distance of that beamlet from a central axis of the beam.

The manner in which a microlens array is formed is well known to the person skilled in the art so that a further elucidation may be dispensed with.

With respect to adjusting, or the adjustability of the microlens array 2', 2'', it is noted that this may be realized by aptly positioning the microlenses or by controlling them in the proper manner. This makes it also possible to adjust the deflection of the beamlets such that in the imaging point 4, the beamlets have a mutual phase difference of 0 or 2 pi or a whole multiple of 2 pi. In a special case this makes it possible to achieve that the beamlets have substantially the same optical path length between the beam source 1 and the imaging point 4.

Figure 3:
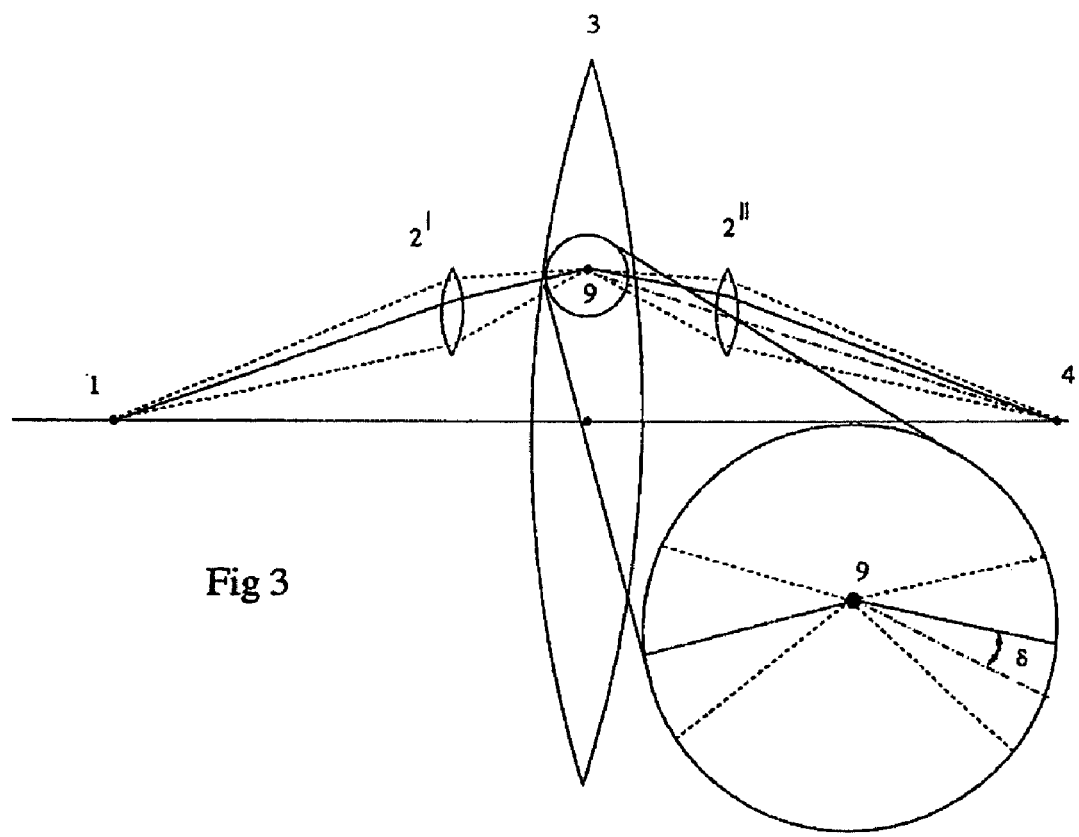
FIG. 3 a detail of the apparatus shown in FIG. 2.

In FIG. 3, the corrective action of the microlenses 2', 2'' is further explained by way of a detail. The figure shows an inset depicting a magnification of the path of the beams in the macrolens 3.

In FIG. 3, $\delta$ indicates an angular deflection error of macrolens 3. This angle $\delta$ designates the aberration of an actual beam path, shown by the dot and dash line as opposed to the continuous line, which represents the ideal beam path. This deflection error $\delta$ is compensated by the fact that the microlenses 2'' image the focal point 9, located substantially in the macrolens 3, in the desired imaging point 4 irrespective of the angle of incidence of the beams coming from focal point 9. As long as the beams shown as dash lines remain within the aperture angle of the respective microlens 2', 2'', the chromatic and spherical aberrations of macrolens 3 can be fully compensated by the microlens 2', 2''. It is therefore important that the microlenses 2' and 2'' form focusing means with confocal images in, or substantially in, the macrolens 3.

As already mentioned, the beamlets may be formed by the microlens array 2', 2''. This is shown in FIG. 2 as well as in FIG. 4, which will be discussed below. It is also possible to form the beamlets with an aperture array and to add this aperture array to the apparatus between the beam source 1 and the microlens array 2.

Figure 4:
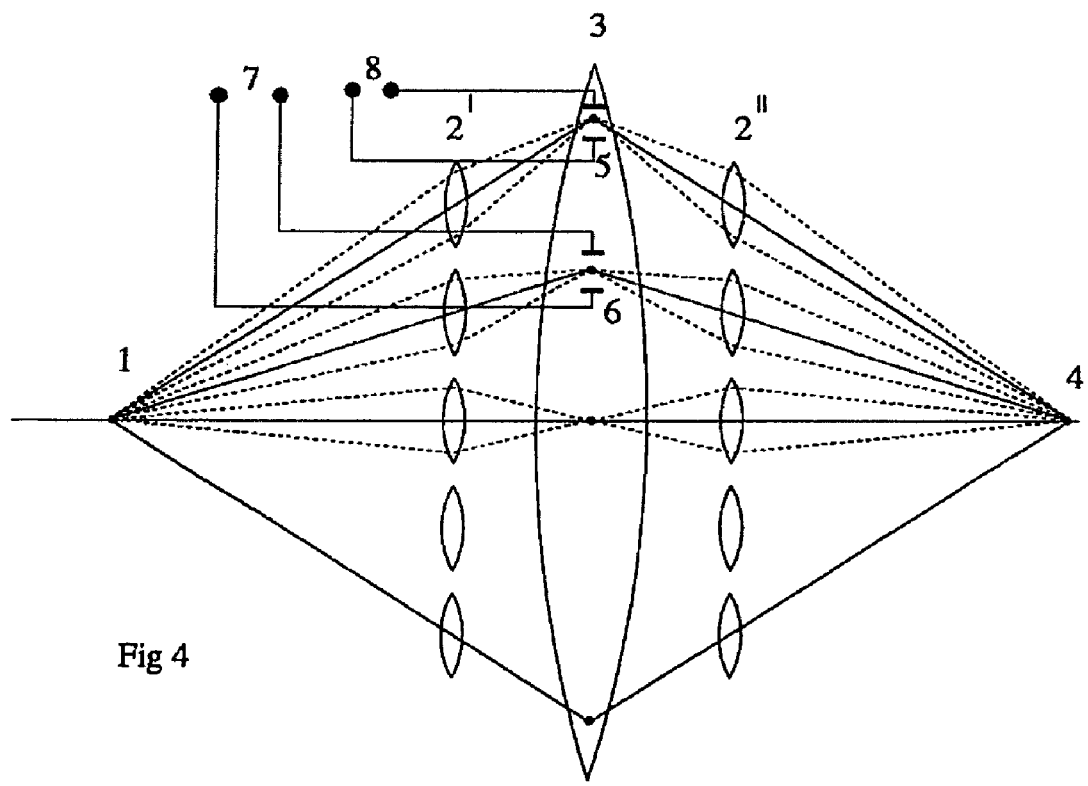

FIG. 4 shows an embodiment of the apparatus according to the invention, in which the macrolens 3 in the path of each beamlet is equipped with a deflector 5, 6, which deflectors possess connectors 8, 7 with which in the focal plane of the macrolens 3 the aberrations of this lens can be corrected further. It is also possible to dispense with the macrolens 3, leaving the deflectors 5, 6 for realizing a desired deflection.

Figure 5:
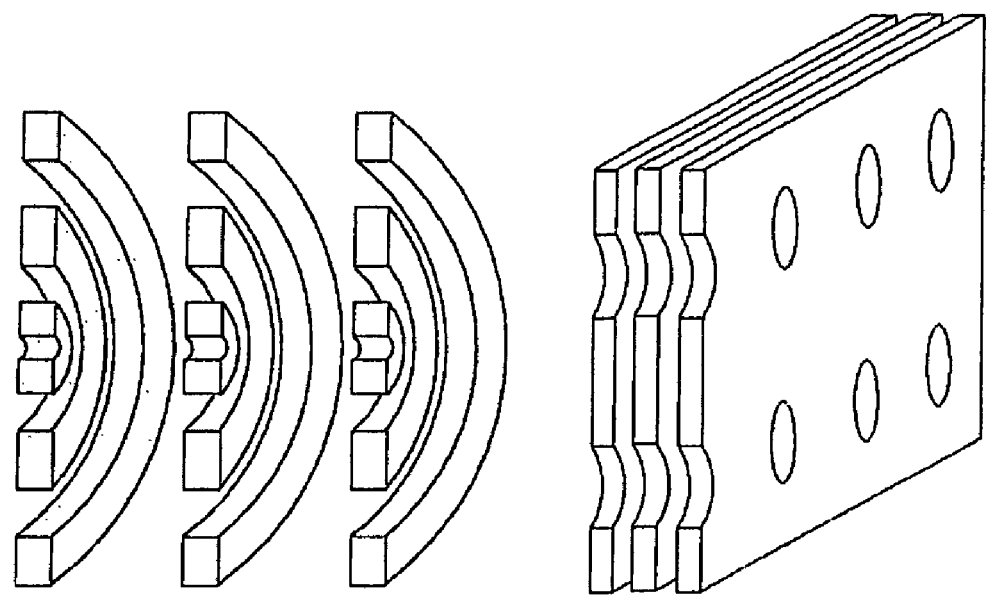
FIG. 5 two types of focusing means that may be used in the apparatus according to the invention, and FIGS. 6 and 7 two possible further embodiments of the apparatus according to the invention.

FIG. 5 shows that to provide the focusing means, several substantially identical plates are positioned one behind the other, with the possibility of applying to each plate a different potential in order to obtain the desired focusing effect.

At the top of FIG. 5, an embodiment is shown, wherein the plates are provided with a matrix of openings.

At the lower side of FIG. 5, an embodiment is shown wherein the plates have circular slots.

If the apparatus is intended for the formation of a light image, then—instead of applying different potentials to the plates—suitable lenses for focusing light are provided at the position of the holes of the matrix, or at the position of the circular slots.

Figure 6:
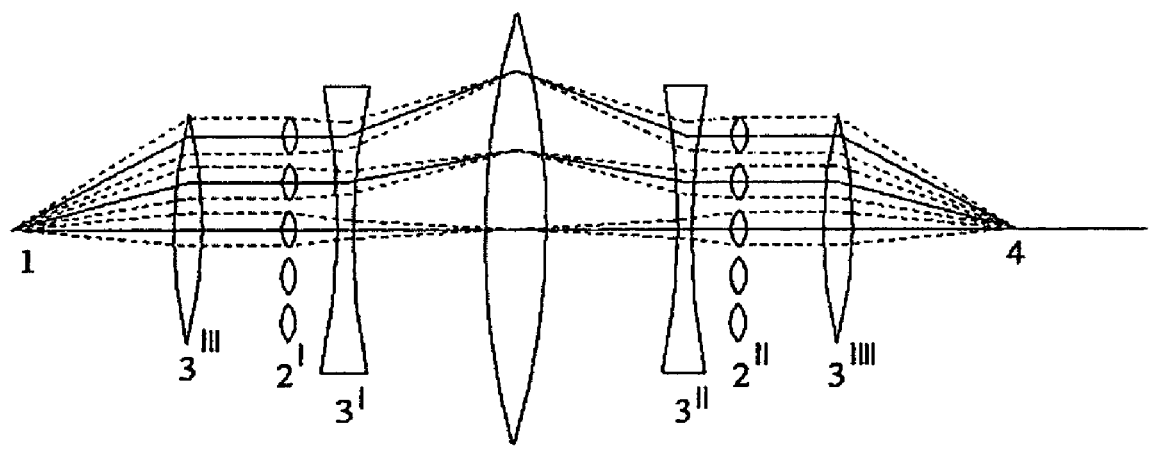
Figure 7:
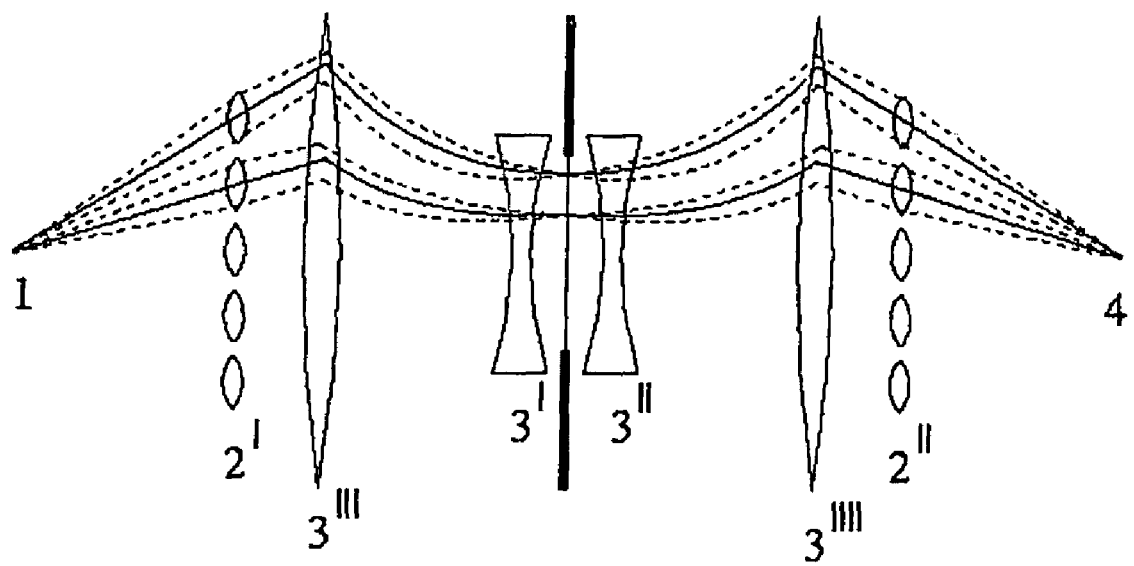

To illustrate that many embodiments are possible to realise the apparatus, FIGS. 6 and 7 show some additional embodiments of the apparatus according to the invention.

FIG. 6 shows a symmetrically constructed apparatus wherein both at the left side and at the right side of the main macrolens 3, and viewed from this main macrolens 3, first a negative lens 3' or 3'', respectively, is provided, after that a microlens array 2' or 2'', respectively, and finally between the microlens array 2' or 2'', respectively, and the beam source 1 or the imaging point 4 respectively, another macrolens 3''' or 3'''', respectively. This makes it possible to ensure that each microlens array 2', 2'' receives parallel beamlets.

FIG. 7, finally, shows an apparatus according to the invention that is also constructed symmetrically and possesses a centrally placed foil or fine-mesh grid 5. Viewed from this foil of grid 5, a negative lens 3', 3'', a macrolens 3''', or 3'''', respectively, and a microlens array 2', 2'' is provided at both sides thereof. Since the foci of the microlenses arrays 2', 2'' lie in the plane of the foil or the grid 5, the individual beamlets suffer hardly any or no aberrations.

What is claimed:

1. A method for forming an image of a beam source that during operation provides a beam, and wherein the beam is split so as to divide the beam into beamlets, wherein a redirecting organ is used with which each individual beamlet is redirected to a predetermined degree with the extent of redirection of each beamlet by means of the redirecting organ depending on the distance of that beamlet to a central axis of the beam, such that the beamlets converge in a common point with the beamlets from the beam source being focused to foci located in the redirecting organ, and with the beamlets originating from these foci being focused in the common imaging point, and wherein the deflection of the beamlets is adjusted such that at the imaging point, the phase difference between the beamlets is 0 or 2 pi or a whole multiple of 2 pi.

2. A method according to claim 1, wherein the deflection of the beamlets is adjusted such that the beamlets have a substantially equal optical path length relationship between the beam source and the imaging point.

3. A method according to claim 1, wherein viewed in the radial direction from the axis of the beam, the dimension of each beamlet is such that no noticeable spherical aberrations remain.

4. An apparatus comprising a beam source and a beam splitter for the formation of beamlets from a beam originating from the beam source, as well as a redirecting organ for the redirection of the beamlets, wherein a first array of focusing means is provided before the redirecting organ and a second array of focusing means is provided after the redirecting organ, wherein the first array of focusing means, the second array of focusing means, and the redirecting organ are adjustable or are adjusted such that the beamlets originating from the beam source converge in foci located in the plane of the redirecting organ, the extent to which the redirecting organ redirects the beamlets depends on the distance of each beamlet to a central axis of the beam, and the beamlets originating from the foci located in the redirecting organ are focused on a common imaging point, where these beamlets converge, and wherein the redirecting organ is embodied as a macrolens.

5. An apparatus according to claim 4, wherein the first array of focusing means and/or the second array of focusing means comprises a microlens array.

6. An apparatus according to claim 4, wherein the beam splitter is embodied as the first array of focusing means or as part thereof.

7. An apparatus according to claim 4, wherein the path of each beamlet, the macrolens is provided with a deflector.

8. An apparatus according to claim 4, wherein the redirecting organ is embodied as a collection of deflectors.

9. An apparatus according to claim 4 for application to charged particles such as electrons or ions, wherein the first array of focusing means and/or the second array of focusing means are embodied as a system of plates in which openings are provided, which plates during operation may have a potential that is adjusted to a desired degree of focusing.

10. An apparatus according to claim 9, wherein the openings are chosen from the group consisting of a matrix of holes and circular slots.

11. An apparatus according to claim 4 for forming a light image, wherein the first array of focusing means and/or the second array of focusing means are embodied as a system of plates in which openings are provided, and lenses are provided in the openings for focusing light.

* * * * *